(12) United States Patent
Tibbett et al.

(10) Patent No.: US 8,522,203 B1
(45) Date of Patent: Aug. 27, 2013

(54) DYNAMIC SCRIPT MANAGEMENT

(75) Inventors: Steve Tibbett, Ottawa (CA); Mark C. Leyden, Oxford Mills (CA)

(73) Assignee: Adobe Systems Incorporated, San Jose, CA (US)

( * ) Notice: Subject to any disclaimer, the term of this patent is extended or adjusted under 35 U.S.C. 154(b) by 1034 days.

(21) Appl. No.: 12/549,967

(22) Filed: Aug. 28, 2009

(51) Int. Cl.
*G06F 9/44* (2006.01)

(52) U.S. Cl.
USPC .......... 717/115; 717/106; 717/110; 717/111; 717/143

(58) Field of Classification Search
USPC .......................................................... 717/115
See application file for complete search history.

(56) References Cited

U.S. PATENT DOCUMENTS

| | | | | |
|---|---|---|---|---|
| 5,475,843 | A * | 12/1995 | Halviatti et al. | 717/124 |
| 5,634,062 | A * | 5/1997 | Shimizu et al. | 715/206 |
| 5,781,908 | A * | 7/1998 | Williams et al. | 709/223 |
| 5,852,825 | A * | 12/1998 | Winslow | 1/1 |
| 5,884,309 | A * | 3/1999 | Vanechanos, Jr. | 1/1 |
| 6,571,232 | B1 * | 5/2003 | Goldberg et al. | 1/1 |
| 7,165,041 | B1 * | 1/2007 | Guheen et al. | 705/26.1 |
| 7,350,192 | B2 | 3/2008 | Seitz et al. | |
| 7,548,913 | B2 * | 6/2009 | Ekberg et al. | 1/1 |
| 7,860,815 | B1 * | 12/2010 | Tangirala | 706/45 |
| 8,166,522 | B2 * | 4/2012 | Martin et al. | 726/4 |
| 8,185,096 | B2 * | 5/2012 | Smith et al. | 455/414.1 |
| 2002/0138582 | A1 * | 9/2002 | Chandra et al. | 709/206 |
| 2002/0163935 | A1 * | 11/2002 | Paatela et al. | 370/466 |
| 2002/0194048 | A1 * | 12/2002 | Levinson | 705/9 |
| 2003/0028451 | A1 * | 2/2003 | Ananian | 705/27 |
| 2004/0034823 | A1 * | 2/2004 | Watkins et al. | 714/724 |
| 2004/0066410 | A1 * | 4/2004 | Lindhorst et al. | 345/769 |
| 2004/0078373 | A1 * | 4/2004 | Ghoneimy et al. | 707/10 |
| 2005/0154765 | A1 | 7/2005 | Seitz et al. | |
| 2005/0193269 | A1 * | 9/2005 | Haswell et al. | 714/38 |
| 2005/0286379 | A1 * | 12/2005 | Kazami et al. | 369/53.21 |
| 2006/0053126 | A1 * | 3/2006 | Baca et al. | 707/100 |
| 2007/0050708 | A1 * | 3/2007 | Gupta et al. | 715/513 |
| 2007/0220481 | A1 | 9/2007 | Gabel et al. | |
| 2008/0098291 | A1 * | 4/2008 | Bradley et al. | 715/223 |
| 2008/0216060 | A1 * | 9/2008 | Vargas | 717/137 |
| 2010/0257541 | A1 * | 10/2010 | Davis et al. | 719/313 |
| 2012/0265648 | A1 * | 10/2012 | Jerome et al. | 705/26.62 |

OTHER PUBLICATIONS

Title: An entity-based service script editor for IN, author: Lane, C.H.R. et a;. dated 1992., source: IEEE.*

* cited by examiner

*Primary Examiner* — Chameli Das
(74) *Attorney, Agent, or Firm* — Schwegman, Lundberg & Woessner, P.A.

(57) ABSTRACT

A method for managing script added to an interactive document or fillable, electronic form. The method includes receiving user input for generating a script and then generating a script based on the user input. The method further includes as part of script generation providing a header in the script that includes a management flag or data in a header block indicating that the script is managed, a managed script object, and an edit verification value such as a cyclic redundancy check value. After the script is generated, the method includes parsing the document to determine whether the managed script has been edited or to otherwise verify the script's integrity. The method includes when the script has been edited modifying the management flag to indicate the script is released from script management. Unmanaged editing may be detected by comparing a stored edit verification value with the header value from each snippet.

18 Claims, 11 Drawing Sheets

DYNAMIC SCRIPT MANAGEMENT

BACKGROUND

1. Field of Description

The present disclosure relates, in general, to computer-implemented methods for generating documents and forms such as finable forms that may be served over the Internet or other network, and, more particularly, to improved methods for providing script with such forms or documents.

2. Relevant Background

With the growing use of communications networks such as the Internet, it has become more common for companies and other users to serve electronic forms or documents in a variety of forms over networks to clients, customers, or other end users. The end users may use a computer or other electronic device and a browser running on this device to access a web page, for example, to view a form or document and to complete the form and then submit the form data back to a web server for processing of the data. A number of form creation applications or tools have been created to assist in designing and creating these forms, and these applications may be used to design interactive forms that are displayed within web browsers and other tools for a user to fill in information or otherwise interact with online or via a computer or other electronic communication device.

As part of the form design process, a form developer may use scripts to provide a richer user experience. A script, e.g., a script, macro, batch file, or the like provided in a scripting language such as JavaScript or FormCalc, is a list of commands that may be executed by a computer or its processor without user interaction. Scripts that perform calculations or other functions may be added to most form fields and objects such as for use in validating data entered in fields in a fillable form and for providing interactive content to a web site with changing colors, showing/hiding graphics, and so on. A script may be created and provided in a form by selecting an object to attach the script to such as a button, by selecting the form event to trigger execution of the script (such as a click event for a button object to cause the script to execute each time a form filler clicks the button while filling the form), by choosing where the script is to run such as on the client application or on the server, and then by writing the script.

Some form creation application or tools also provide script generation tools. For example, a script editor may be provided that provides the form developer a user-friendly interface to add script to a form by selecting an object within the form, associating an event with the object, and then typing or writing their script in a script editing field or window. Once the script is generated, the script may be modified or changed as desired by the form designer.

SUMMARY

Form creation applications allow form designers and developers to add script to electronic forms/documents, and it may be useful in many cases to actively or dynamically manage the generated script. A script management tool or script manager may be provided with a form creation application (or form designer) to protect the integrity of script associated with a form, with some embodiments treating each managed script as a managed script object. The script manager may function to track editing of the script, remove script from a managed script object (or a managed object set associated with a form) when edited outside of a script editing environment, update the script, and/or verify that the script has not been broken or damaged by a form user/designer.

More particularly, a computer-implemented method is provided allowing an online or electronic document to be created with script that can be effectively managed to maintain its integrity and to allow other functions such as script tracking, script removal, and script updating. The method may include receiving user input for generating a script such as user input via a script generating user interface (UI) that associates an event or activity with an object in the document or form. The method may also include generating a script based on this user input, with the script being adapted to perform a particular function during a user's use of the interactive or fillable form (e.g., perform a function when a user selects/clicks on a button in the form). The method may further include during the generating of the script also providing a header in the script that includes a management flag or data in a header block indicating that the script is managed.

After the script is generated such as during document regeneration, the method may include parsing or processing the script to determine whether the script has been edited or to verify the script's integrity (e.g., has the script been edited outside the form/document creation environment provided by a form creation application?). The method may further include in cases when the script has been edited (and possibly broken) modifying the management flag to indicate the script is released from script management or to unmanage the script. To this end, the header may include an edit verification value such as a cyclic redundancy checking (CRC) value and, then, the editing or integrity verification may include comparing this value with the edit verification value of the later received and parsed script. The step of modifying the management flag may include removing the management flag from a block of the header.

The script, in some cases, may include a number of snippets with each of the snippets including a header with a managed script object identification (ID) and for each particular managed script object each of these IDs are equivalent to link them together for management as a set or group. The parsing or processing of the script may include grouping snippets in a document based on their object IDs (e.g., into one, two, or more managed script objects with one, two, or more snippets each). Integrity verification may be performed by inspecting the CRC or other verification value in each of the snippet headers. Then, the method may include when any one of the snippets is determined to have been edited modifying the management block in the header of all the snippets in the corresponding managed script object.

DETAILED DESCRIPTION

The following description describes the use of software (and/or hardware) implementations to provide techniques for managing script that may be added to a form or document during the form/document creation process or later during form/document editing or modifications. Form Creation applications such as the Adobe LiveCycle Designer allow a user to add script to a form as part of the form design process to provide enhanced forms (e.g., to validate data entry fields, to perform calculations, to provide interactive experiences such as color changes, and so on). The form creation environment is modified, as discussed herein, to include a script manager or script management module that functions to identify the created script as a managed script object (such as with a script identification code or ID) and to provide an edit verification flag or marker (such as a cyclic redundancy check (CRC) value). These values may be stored in memory or data storage and, at a later point in document or use (such as when the form or document is regenerated or rendered), the script manager may function to determine if any of the portions of the managed script object (e.g., snippets or sets of script) have been edited outside of the managed or controlled form design/editing environment (e.g., edited by a user outside of a script editing user interface (UI)). If so, the script's integrity may be suspect (e.g., the script may be broken), and the script manager may remove the entire script object including all snippets from the managed script object pool, e.g., by removing a managed script identifier/data from a header of the main snippet or by other actions.

In this description, it may be useful to provide definitions for a number of terms. The terms "form" and "documents" are used interchangeably and may be thought of generally as an electronic or digital data version or set of code/instructions for providing a letter, package, fillable form, or the like that may be stored in a data store or memory. The forms or documents may be a form corresponding to a design-time form prior to being rendered or the terms "form" and "document" may be an electronic version or set of code/instructions in a runtime form after rendering such as a letter filling experience provided based on rendering of a template. Content is typically any data, code, or other components/items that may be included in the form or document. A script is generally a macro, a batch file, or the like provided in a scripting language such as JAVASCRIPT™ or FormCalc providing a list of commands that may be executed by a computer or its processor without user interaction. The list of commands may be called script, and a subset of a larger script may be called a snippet or set of script.

Figure 1:
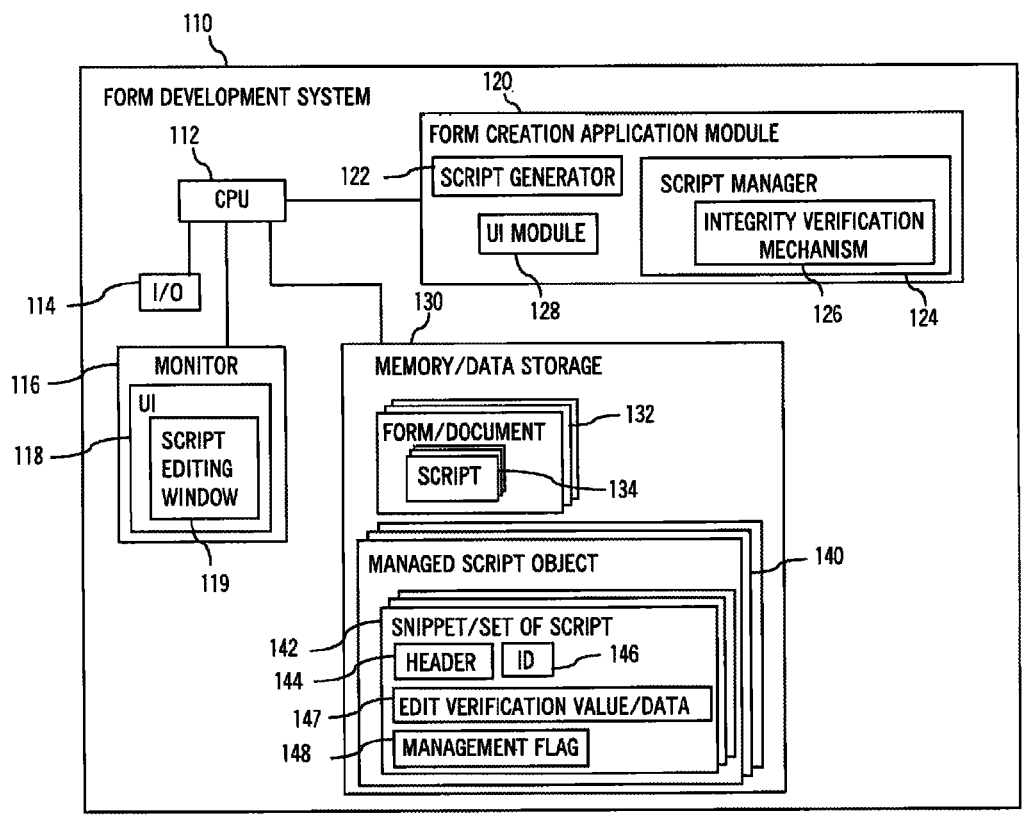
FIG. 1 illustrates in functional block form a computer system implementing script management as described herein as part of a digital form/document creation environment.

FIG. 1 illustrates a computer system 110 as may be used by a form designer or developer to create a form or document such as a finable, digital document that may be served over the Internet or other communications network. The system 110 may include a processor 112 that runs or manages input and output (I/O) devices 114 such as a keyboard, a mouse, a touch pad/screen, a printer, and the like to allow the form designer to enter input or data and to receive output. For example, the form designer may operate the I/O 114 to initiate the form creation environment by causing the system 110 via CPU 112 to run a form creation application module 120 and may then enter input or data to create a form 132 that may include script 134. The system 110 may also include a monitor 116 that is run by processor 112 to display a graphical user interface 118, which may be generated by a UI module 128 of the form creation application module 120 to provide form creation UIs 118 as well as script editor or editing windows 119.

The system 110 may run or include a form creation application module 120 that may take the form of code on computer readable medium that is run by or configured to cause the computer 110 or processor 112 to provide a form creation environment. For example, the form creation application module 120 may include all or portions of an electronic form/document creation application such as Adobe's LiveCycle Designer or the like. The form creation application module 120 is run by CPU 112 to allow a user to generate one or more forms 132 that may intelligence or code to provide an interactive and/or fillable form that may be served to a client device or otherwise used to receive user data (such as to allow a person to use their browser to enter purchasing information, to fill in an insurance form, and so on). The code or intelligence of the form 132 may include script 134 that may be used to automatically perform some function such as to perform a calculation when an event occurs for an object associated with the script (e.g., when a user clicks a button the script may perform a function(s)).

The form creation application module 120 may include a script generator 122 that is useful with UI module 128 to provide a UI 118 that a user of the system 110 may use to generate the script 134 for the document 132. The script generator 122 may assist the user in selecting a form or document, choosing objects to associate the script with in the form 132, to choose actions or events to trigger the script, to enter or type the script in the script editing window 119, and to debug or proof the written script.

To manage the script 134 provided in the forms 132 created via the UI 118 (or via running the creation application 120), a script manager 124 is provided that allows the generated script to be tracked, to be removed from management, to be updated, and to verify that the user has not broken it such as by editing in an undesirable manner. The script manager 124 may be run by CPU 112 to create and store a plurality of managed script objects 140 that may be stored in memory/data storage 130 (or the data useful for managing such objects 140 may be stored in memory 130). Each managed script object 140 may include one or more snippets or sets of script 142. Each snippet 142 is created by the script manager 124 (or operations of the script generator 122) to include a header 144 that may include data used to identify the snippet as managed script, e.g., a management flag 148 that may be provided in the header 144 or in a separate line or portion of the snippet 142. Further, an ID 146 may be provided with each snippet 142, such as within the header 144, to allow the snippets 142 to be linked or tied together as part of a particular managed script object 140 (e.g., each script 142 in an object 140 may have an identical ID code, number, or value).

The script manager 124 may include an integrity verification mechanism 126 that may operate to verify whether one of the manage script objects 140 (or script 134) within form 132 has been impermissibly edited (such as outside of the UI 118). To this end, each snippet 142 may include an edit verification value or data set 147, and the integrity verification mechanism 126 may be run by CPU 112 to determine if the script 134 has been edited by comparing the value in the script 134 with the value 147. In some embodiments, for example, the value 147 is a CRC value that is changed when edited outside of the UI 118. When the integrity verification mechanism 126 detects a mismatch in the CRC value 147 and the edit verification value in the script 134, the script manager 124 may act to remove the entire managed script object 140 and associated snippets 142 from the managed pool of objects 140. For example, the management flag 148 may be changed or removed in all the snippets 142 of the object 140 to indicate that the script 134 associated with the object 140 is no longer managed (e.g., may be broken or at least has been modified outside of the managed/controlled script creation environment provided by the form creation application module 120.).

The system 110 is operable not only to assist a user in adding script to a document (e.g., a validation UI may request a user to add script in a number of places), but it also allows the generated script to by dynamically managed. One aspect of such management by the manager 124 is to protect the integrity of all pieces of the script via the use of the edit verification value/data 147 (such as a CRC value generated when the script is generated) in each snippet or set of script 142 within a managed script object 140. In some embodiments, a user may edit any one of the scripts 142 by hand or outside a managed environment provided by a creation tool 120, but this will result in the CRC or other value 147 of the edited script differing from the originally-generated CRC value, which will be detected by the integrity verification mechanism 126. The script manager 124 then will unmanage the script object 140 (all snippets 142 associated with a particular ID 146). The use of the system 110 may allow wholesale changes to be made to multiple pieces of managed script 134 in a form, such as when a user changes a property in the form 132 that changes a target object the script is being generated for in the form 132. The script manage 124 may also be used to generate different scripts, such as for differing versions of a client application used to read/view forms 132, and the changes to the managed script objects 140 may be performed transparently to the user or form designer. This is the case because the script manager 124 is able to replace managed script 142 at will or without developer interaction.

As shown in FIG. 1, each managed script object may include a number of snippets or sets of script 142. In other words, the script manager 124 treats all the generated script 134 associated with a single ID as one object 140 that the developer can works with, and changes made in the US 118 may be rendered back out to the various places where the script 134 (e.g., the locations of the script 134 in the form 132 may be tracked and maintained after changes are made to allow the document 132 to be properly regenerated after script modifications/changes). This makes it much easier for a developer of a form to add features that depend on injecting script 134 into a form 132.

Figure 2:
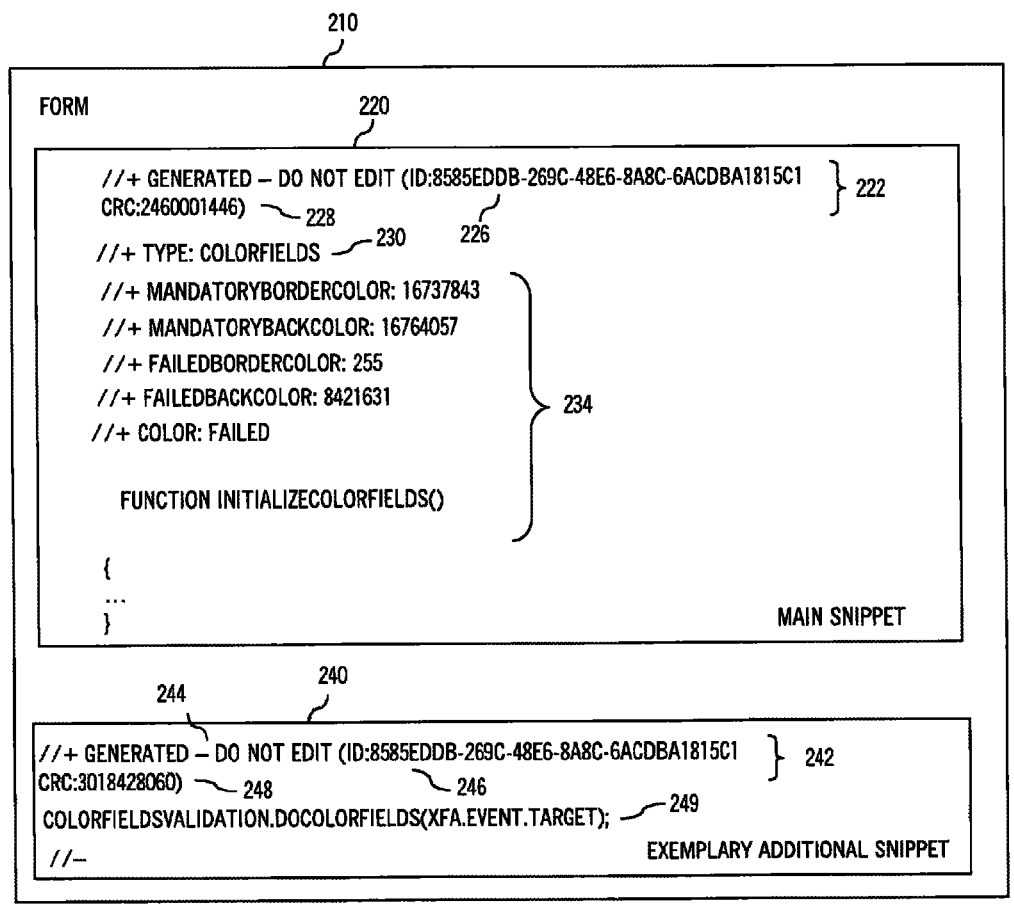
FIG. 2 illustrates schematically a form or document that may be generated, for example, using the system of FIG. 1 showing managed script in the document including a main snippet and an exemplary additional snippet, which may be linked via an identifier in a single managed script object.

FIG. 2 illustrates generally a form or document 210 that may be generated by operation of the system 110 and its script manager 124. The script manager 124 allows other features such as the script generator 122 to operate to create scripts in the form 210 that are then managed by the script manager 124. A managed script or managed script object in form 210 may include one or more snippets or sets of script (e.g., script code such as JAVASCRIPT™ script that ends up or is provided in the form). In FIG. 2, the form 210 is shown in form 210 to include snippet 220 and snippet 240 as part of a managed script object.

One snippet in each managed script object of a form is typically a main snippet. Form 210 is shown to include main snippet 220, and the main snippet 220 includes a header block 222 that is used by the script manager 124 to deserialize the script 234 into a managed script object. The managed object of form 210 may be created using a color failed fields validation UI in a form creation application. As shown, the header 222 may include text or a flag 224 that indicates during parsing by the script manager 124 that the snippet 220 is managed script. The header 222 may also include an ID 226 that provides a link to a particular or single managed script object of the form 210. The script manager 124 may also insert an edit verification value 228 such as a CRC value, and the integrity verification mechanism 126 may later parse the script 220 to determine if the CRC value has changed, which indicates that editing has occurred (or that some part of the snippet 220 has been altered), and, in response, the script 222 may be removed from management (e.g., by removing the flag 224 or taking other actions/modifying the snippet 220). The main snippet 220 may include data, code, or script indicating to the script manager 124 that it is the main snippet, with the snippet 220 shown to include a "Type" entry that is understood by the script manager 124 to identify a main snippet of a managed script object.

Other scripts such as script or snippet 240 may also be generated or added to the form 210 with a set of script 249. The snippet 240 also includes a header 242 with a management flag 244 indicating that this script 249 is managed, but "Type" is missing to indicate this is not a main snippet in the managed script object. Also, the snippet 240 includes an object ID 246 that has a value that matches the ID 226 of main snippet 220. In other words, conceptually the snippets 220, 240 are all part of a color failed field script or a single managed script object for form 210, and the snippets 220, 240 are associated or linked together through the IDs 226, 246 includes in the first line of the headers 222, 242. The snippet 240 also includes a CRC value 248 in the header 242 that may be used by the integrity verification mechanism 126 to protect the integrity of the managed script 240 by verifying that editing has not occurred outside the script/form generation environment that includes script manager 124.

During use of the form 210, a script manager 124 may scan the form or document 210. During scanning, the manager 124 may find all snippets 220, 240 with related IDs 226, 246. Then, the manager 124 may act to find the main snippet 220 with the descriptor block 234 and from parsing this block, the manager 124 may parse out the intent of the managed script or managed script object including other scripts with the same ID such as snippet 240. At this point, the actual script is substantially irrelevant because the script manager 124 may regenerate the action, and if the script useful for rendering the action into the form 210 has changed (e.g., a new event may be used and the old event is no longer used), the rendering of the managed script back into the document 210 causes the desired changes to be made.

To preserve the integrity of the managed script 220, 240 as well as to provide the ability to parse and update it, the script manager 124 detects changes by way of a CRC mechanism 126. If a user edits any of the snippets that belong to a particular managed script (such as edits snippet 240), the header blocks 224, 244 that identify the snippets as managed are removed by the script manager 124, and the script simply is no longer managed, which generally may mean that the user is free to edit it but that it disappears or is removed from the managed script UI 118 provided by the form creation application module 120. In some implementations of the script manager 124, the existing script of a form may be preserved in a method, and, additionally, the order of the existing script relative to script that is generated may be preserved or stored in memory. Then, if a user inserts script before or after the managed script (or between two managed scripts or snippets), the managed script is maintained along with its relative position in the form.

Figure 3:
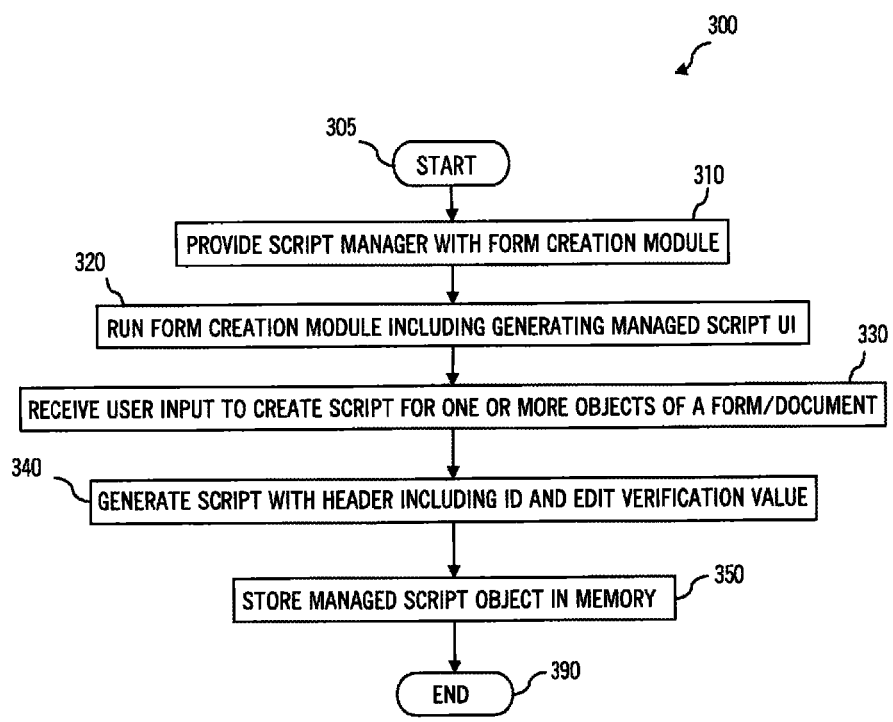
FIG. 3 is a flow diagram of a method of generating managed scripts.

FIG. 3 illustrates a method 300 of generating a set of managed script such as may be included in an electronic form or document or as may be used in other environments. The method 300 starts at 305 such as by choosing a script management environment such as form creation applications that may be accessed on client devices directly or served over communication networks such as the Internet, a local area network (LAN), or the like, and such documents or forms may include script to provide automated functions, with the documents being used locally on client devices or served in a rendered form to client nodes (e.g., such as a network-enabled device for accessing a web server over a network). At 310, the method 300 continues with providing a script manager along with a form creation module or application, and the form creation module may be run on a local work station or made available fully or in part via a networked server. For example, the form creation module may include Adobe LiveCycle Designer or another form/document creation tool.

At 320, the form creation module is run by one or more processors to provide form generation, tools and interfaces to a user on their client device or node, which may include generating a managed script UI to allow the user to create script that for a form that is part of a group of managed script. At 330, the method 300 includes receiving user input to create script for one or more objects of a form/document that is being created in the form creation environment. This typically will include a user choosing an object, associating a triggering event with the object, and writing, selecting, or otherwise providing script to perform a function in response to the event (e.g., clicking a button within a fillable form or the like). At 340, the method 300 includes generating script based on the user input, and the managed script includes an ID for the managed script object (all snippets associated with a managed script object have the same ID to link them together). At 340, the generated script may also include an edit verification value such as a CRC value that allows verification of whether or not the script is edited manually outside the managed script UI (or script editing window of a UI provided within the form creation application).

At 350, the managed script object is stored in memory accessible by the script manager, and, in some cases, the stored data includes at least the object IDs to allow parsed script of documents to be grouped into managed objects (and unmanaged, updated, and so on as a linked set) and CRC values to allow checking for script integrity (e.g., CRC generated during script generation). At 390, the method 300 may end or it may continue at 330 with receiving additional script creation input from a user (e.g., each document may have two or more snippets or sets of script for each managed script object and may include two or more managed script objects).

Figure 4:
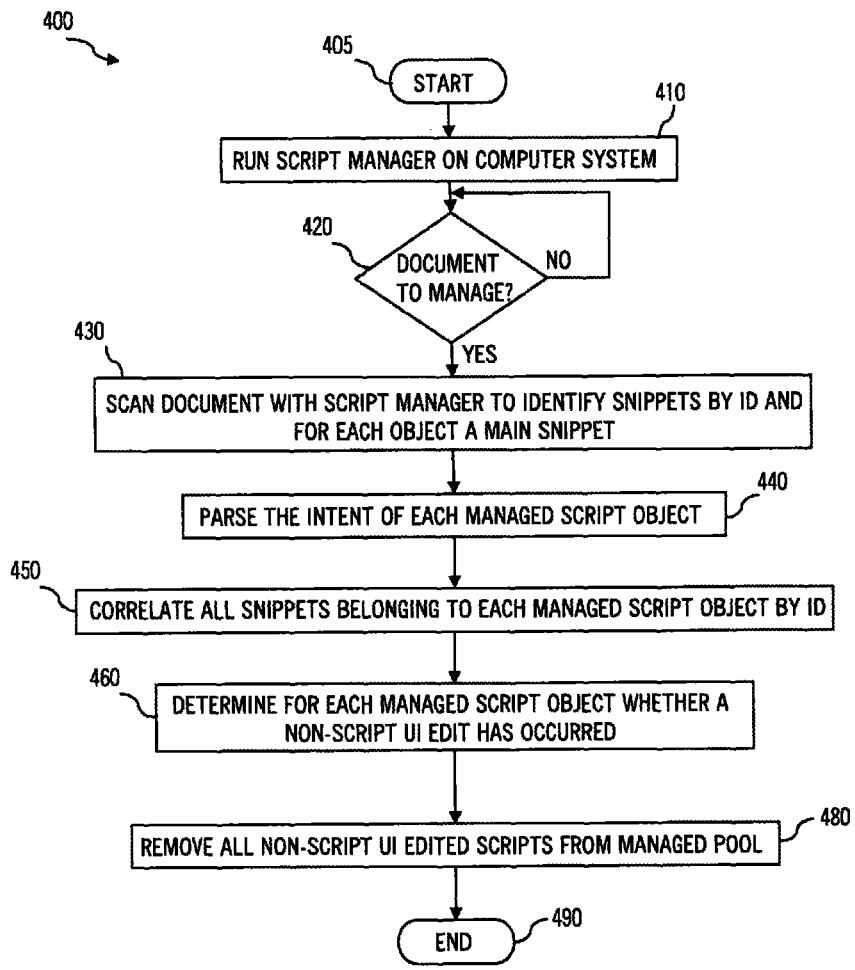
FIG. 4 is a flow diagram of a method of managing scripts to maintain integrity (e.g., by controlling editing outside of one or more script generation or editing user interfaces or the like)

FIG. 4 illustrates a script management method 400 that may be carried out by the software, firmware, and/or hardware as described herein (such as by operation of system 100). The method 400 starts at 405 and at 410 a script manager is run on a computer system such as part of a form creation application or that may be called by such an application. At 420, the method 400 continues with checking whether a document or form is to be managed such as a document is to be regenerated, served to a client, or the like. If not, the method 400 continues at 420. If yes, at 430, the method 400 continues with scanning the document with the script manager to identify snippets by their managed script object ID. Step 430 may also include determining which of these snippets for each managed script object is the main snippet (such as by finding a "Type:" line or some other main snippet identification information or data). The main snippets of each managed script object may then be parsed at 440 to determine the intent of each of the managed script objects.

All snippets with a matching ID are grouped into a single object at 450 with the IDs (typically provided in a header) linking the various snippets or sets of script throughout the document. At 460, the method 400 continues with determining for each managed script object whether an edit of the script has occurred outside the managed environment such as outside or without use of the script editing UI provided as part of the form creation application environment. In some embodiments, a CRC value is included in the header of each of the snippets, and any editing will result in the CRC value for an edited snippet differing from the original snippet such that a comparison of a present CRC value of an improperly edited script by the script manager or its integrity verification mechanism with the CRC value for that snippet or set of script reveals the unmanaged editing of this snippet.

At 470, the script manager may act to remove all script objects from the managed script pool or set that are determined in 460 to have had a manual or other unmanaged script edit occur. The editing may be to any one of the snippets of a managed object, and an unmanaged edit of a single snippet within an object results in all snippet of the object being released from management. In one embodiment, step 480 includes removing data or a block in the header of each of these snippets of an object that had been used to indicate the snippets were managed by the script manager. In other cases, a managed flag value may be modified or toggled to indicate the object and all its snippets are not presently managed. The method 400 may end at 490 or continue with another managed document at 420.

At this point, it may be helpful to provide several screen shots of UIs that may be provided to a user (e.g., a form designer) to assist them in creating a form with script that may be managed as described herein. For example, the screen shots presents in FIGS. 5-11 may be generated by the UI module 128 of the form creation application module 120 of system 110 shown in FIG. 1, with script management provided by running the script manager 124. FIGS. 5-8 relate to screen shots of a UI that may be provided by an action builder module within a form creation application to generate and manage script.

Figure 5:
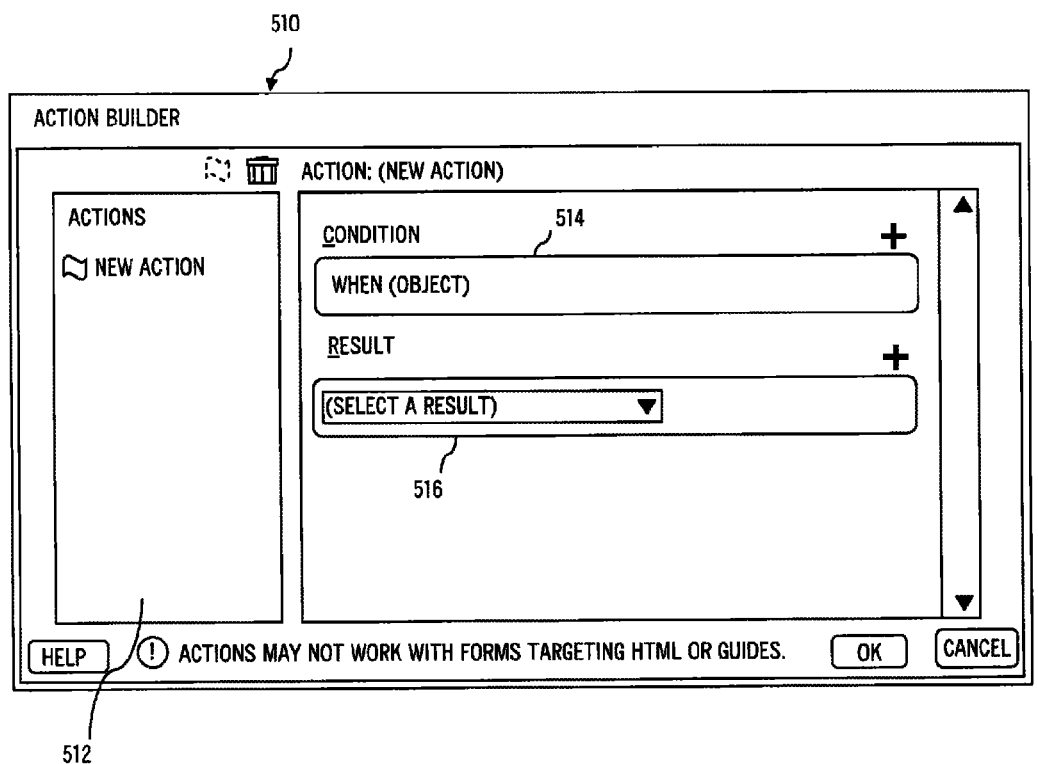
FIGS. 5-8 illustrate screen shots of user interfaces that may be generated and displayed during operation of the system of FIG. 1 such as during an action builder process that generates a managed script.
Figure 6:
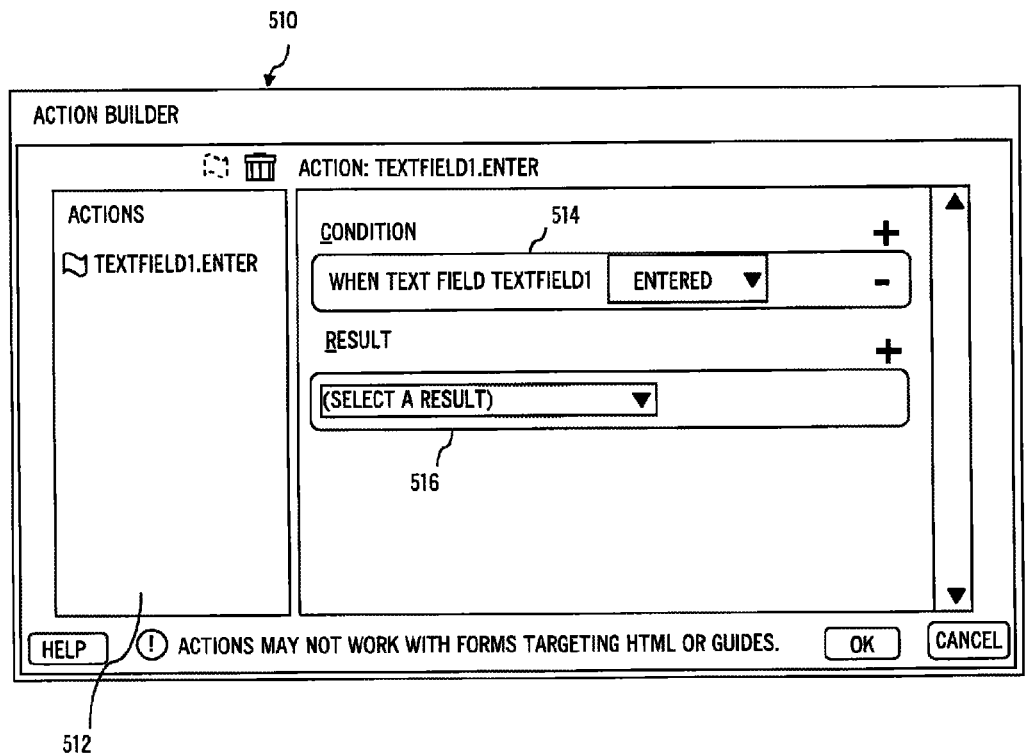
Figure 7:
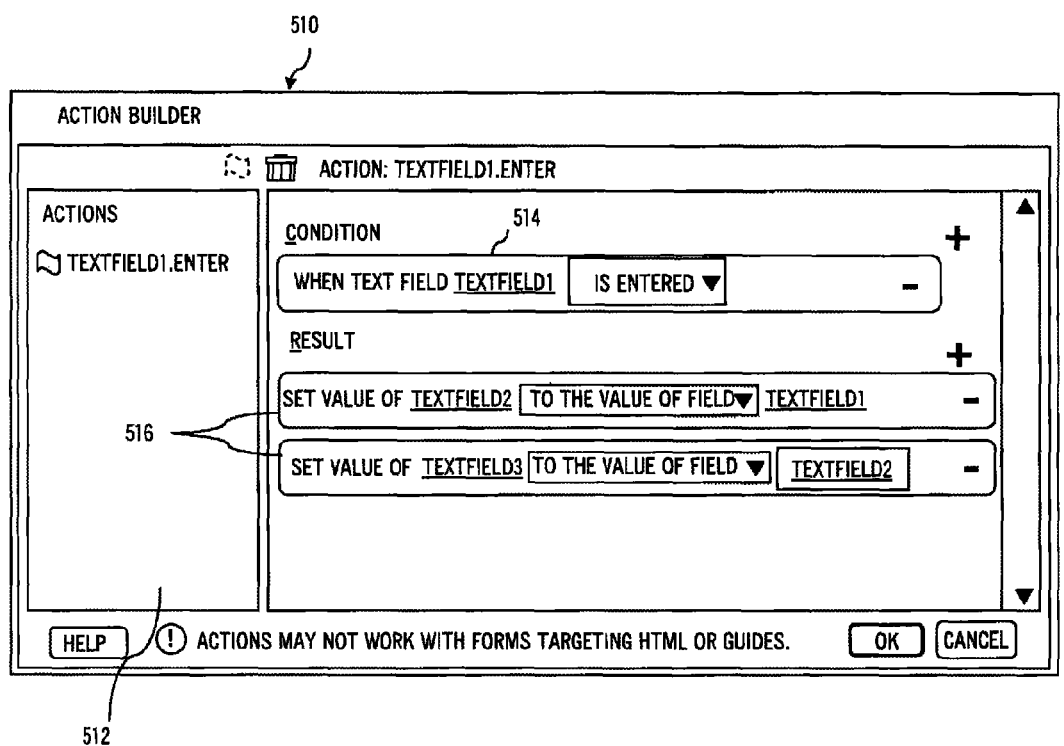
Figure 8:
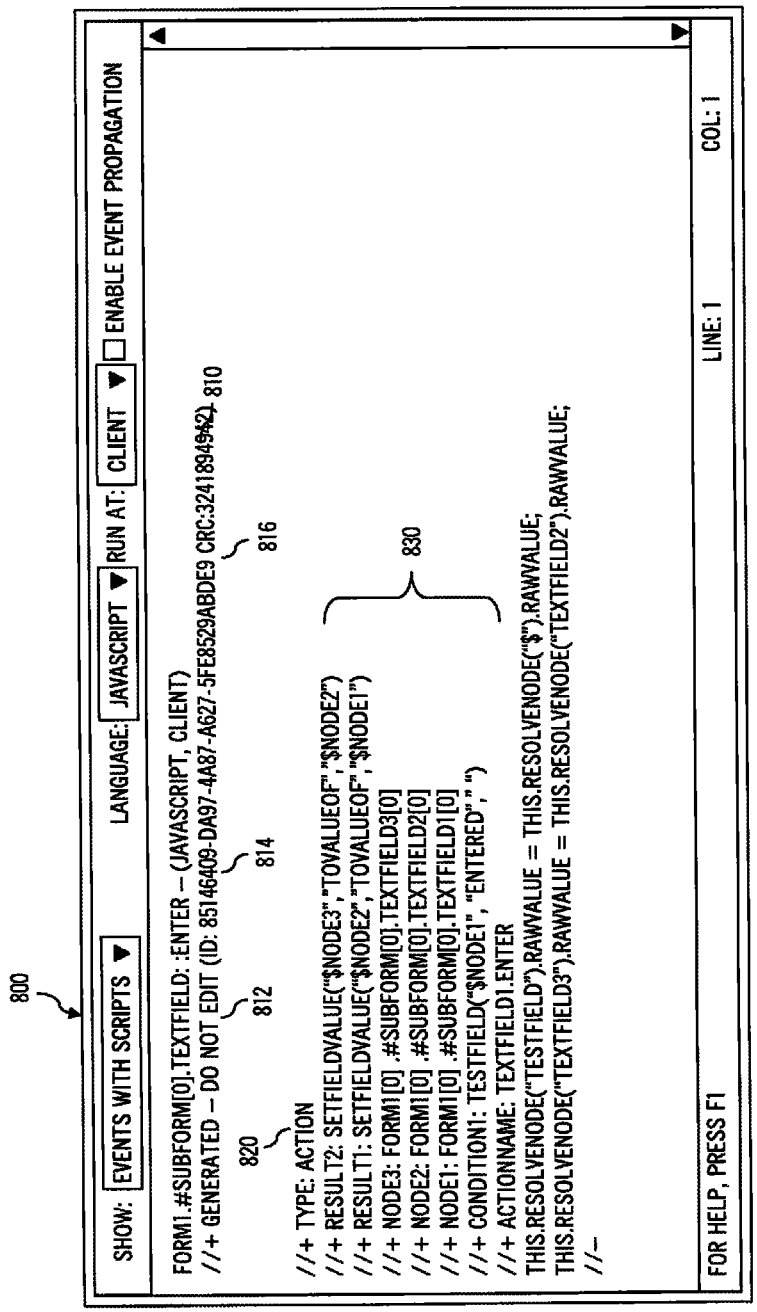

FIG. 5 illustrates a screen shot of a UI 510 of action builder that includes an action window 512 showing that a user has started a new action script, and the action script builder UI 510 may include portions such as pull down menus or text entry boxes or the like 514, 516 for entering conditions and results for the action selected in window 512. In UI 510 of FIG. 5, no conditions 514 or results 516 have been entered. In FIG. 6, the UI 510 has been utilized by the user to name/select the action in window 512 and a condition has been added to the action. In FIG. 7, the UI 510 has further been used by the user of the script generator to add a result at 516 for the action 512 when the condition 514 occurs. FIG. 8 illustrates a UI 800 that is provided by a script generator/manager of a form creation application to show an event/action script that may be created in a managed environment, e.g., based on the UI operates shown in FIGS. 5-7. The managed script shown in UI 800 includes a header 810 and a set of script 830. The script of UI 800 is a main snippet as shown by inclusion, in this case, of the "Type: Action" line or main snippet identification information 820.

The header 810 includes a block 812 that provides a management flag or information that may be parsed to determine the script of UI 800 is actively managed script (or part of a managed script object). The header 810 further includes a managed object ID 814 as well as a CRC value 816, and these portions of the header 810 allow a script manager module to determine which managed script object the script is part of and also to verify the integrity of the script (e.g., whether manual editing outside a script generator such as that shown in FIGS. 5-7 have been used to create/edit the script).

Figure 9:
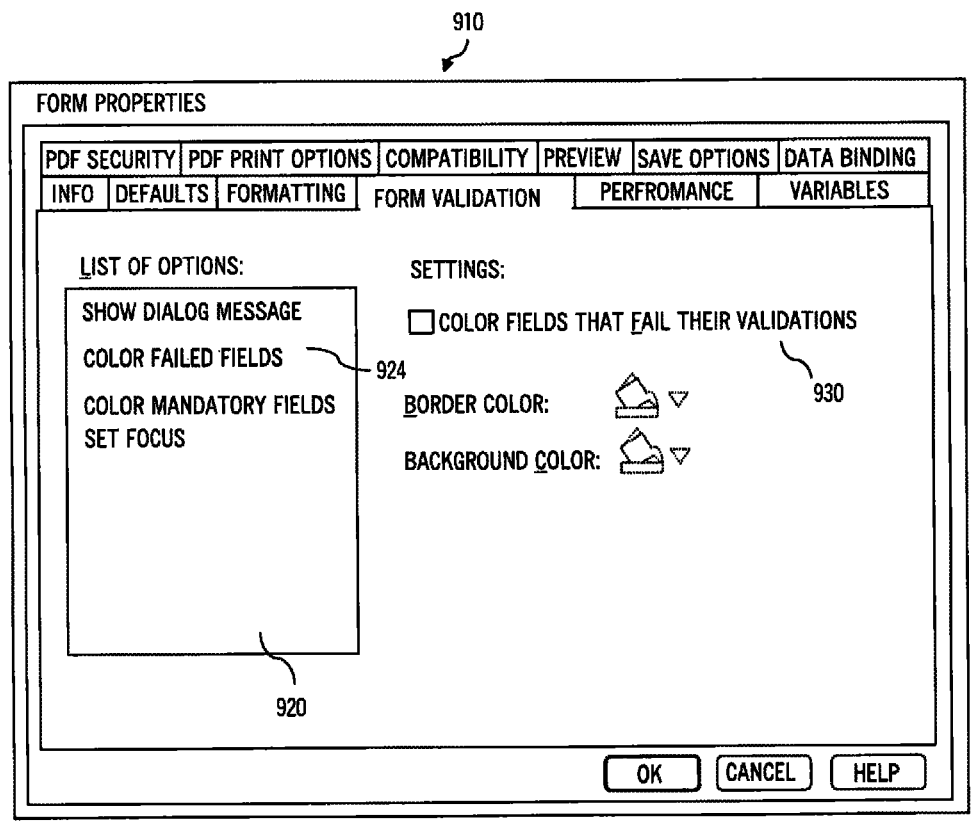
FIGS. 9-11 illustrate screen shots of user interfaces that may be generated and displayed to a user during operation of the system of FIG. 1 such as during a form validation process within a form or document creation process to create managed scripts for a form or electronic, interactive document.
Figure 10:
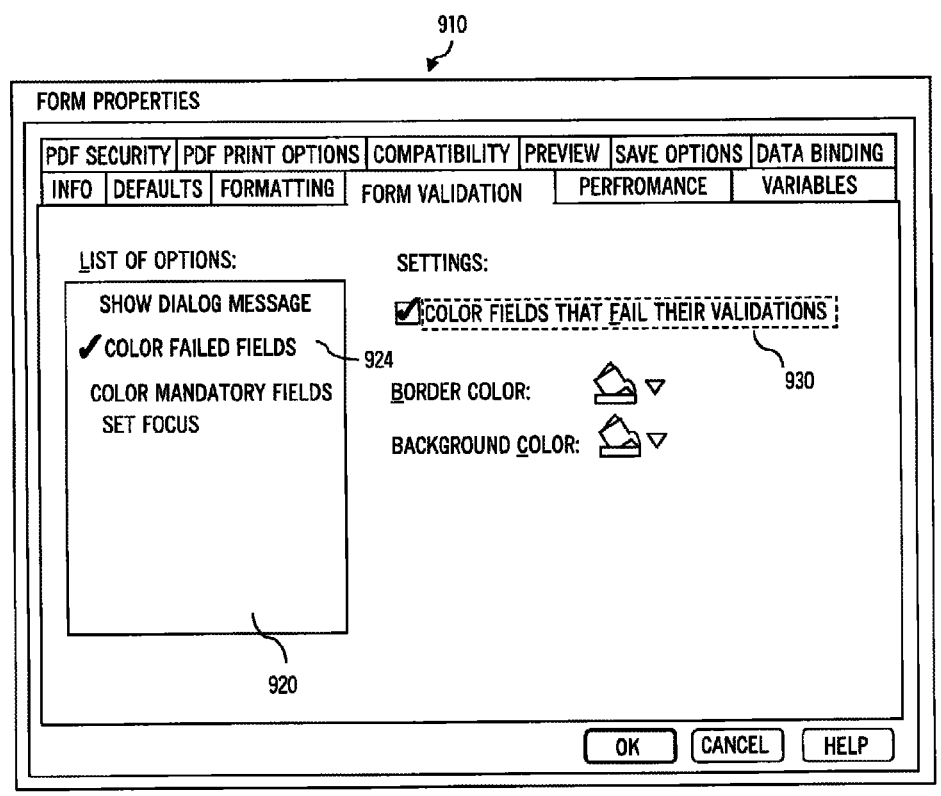

FIG. 9 illustrates a screen shot of a UI 910 that may be provided during operation or use of a form creation application. In the UI 910, a user has selected the form validations tool such that a list of options window 920 and a settings window may be provided. The user has chosen at 924 the color failed field option in window 920, which affects the setting choices 930 provided in the settings portion of UI 910. The UI 910 may be used to assist a form designer in creating a form or document that adds script in several places as part of the validation of data entry within the form by an end user of the form/document (e.g., to validate that proper data values have been entered into text fields, that a proper data has been provided, that mandatory fields have been filled in the form, and so on). In FIG. 10, the user of UI 910 has enabled (as shown at 930) script to color fields that fail their validations, with the user able to choose colors for borders and background in pulldown lists of the settings window/portion of UI 910.

Figure 11:
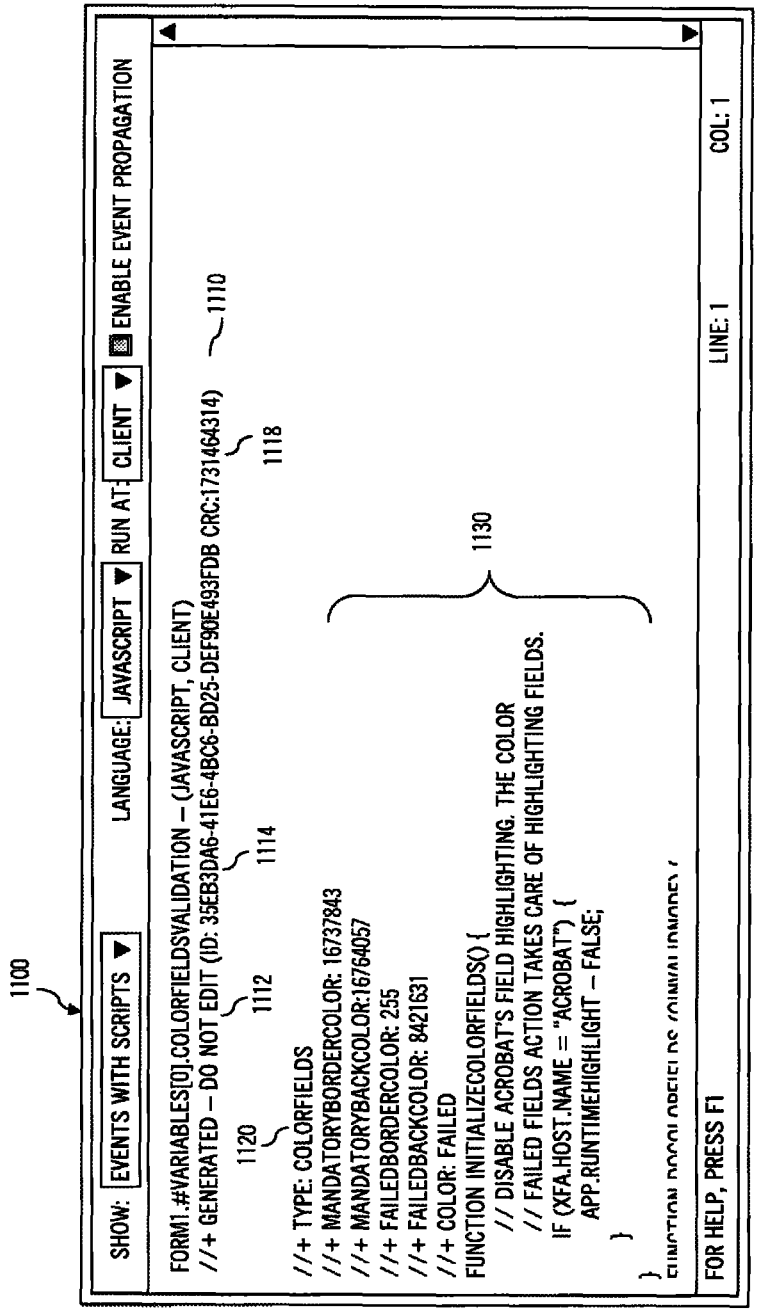

FIG. 11 illustrates a UI 1100 showing the managed script generated by the operation of UI and an associated script generator and script manager. As shown, the UI 1100 shows a portion of the script 1130, and the UI 1100 shows that the managed script includes a header 1110 along with a flag or main header block 1120 indicating to a script manager that this is the main snippet of the managed script object (e.g., with inclusion of "Type" in this non-limiting example). The header 1110 includes a management flag or block (e.g., "Do Not Edit") that indicates to a script manager that this is a managed snippet. The header 1110 also includes an ID 1114 with a value that is assigned to all snippets of a single managed script object. Further, the header 1110 includes a CRC value 1118, which allows a later comparison of a current CRC with this value to verify that a managed snippet has not been edited outside the UI 1100 (or other script editor of the script generating tool or form creation application).

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. Embodiments (such as the system shown in FIG. 1, the methods of FIGS. 3 and 4, and the UIs and managed scripts shown in FIGS. 2 and 5-11) of the subject matter and the functional operations described in this specification may be implemented in digital electronic circuitry, or in computer software, firmware, or hardware, including the structures disclosed in this specification and their structural equivalents, or in combinations of one or more of them.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the form creation application, the script generator, the script manager, fillable documents with intelligence including managed and unmanaged script, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term "form generating system" encompasses all apparatus, devices, and machines for processing data, including by way of example a programmable processor, a computer, or multiple processors or computers. The system (such as system 100 of FIG. 1) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 1 is a block diagram illustrating one embodiment of a computer system 110 configured to implement the methods described herein. In different embodiments, computer system 110 may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user (with an I/O portion 114 of system 100 or monitor 116 of system 100 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A computer-implemented method, comprising:
   associating an event with an object of a form using a form creation application module;
   generating, using a script generator associated with the form creation application module, a script to perform a function during use of the form based on the event and the object, the script including one or more snippets, each snippet including a header having an edit verification value and an identification associated with the script;
   using a processor, associating data with the script, wherein the data comprises a management flag indicating whether or not a script manager should manage the script;
   after the generating of the script, parsing the script, using the script generator, to determine whether the script has been edited outside of the script generator, the parsing linking the one or more snippets to the script based on the identification found in each snippet header, whereby the modification of one of the edit verification values results in all snippets in the script being removed from management; and
   in response to a determination that the script has been edited outside of the script generator, modifying the management flag to indicate the script manager should not manage the script.

2. The method of claim 1, wherein the script includes one or more headers, wherein at least one of the headers includes an edit verification value, the method further including storing a first edit verification value for at least one of the headers in memory when the script is created, wherein the determining whether the script has been edited outside of the script generator comprises comparing the stored edit verification value with a second edit verification value for a corresponding at least one of the headers in the script.

3. The method of claim 2, wherein the first and second edit verification values comprises cyclic redundancy checking values.

4. The method of claim 2, wherein the modifying of the management flag comprises deleting the management flag from a block of the header.

5. The method of claim 1, wherein the script comprises a plurality of snippets, wherein each of the snippets comprises a header with an object identification (ID), and wherein the object ID is equal for each of the snippets of the script.

6. The method of claim 5, wherein the parsing of the script comprises grouping snippets in a document with the object ID and inspecting an edit verification value in each of the snippets headers to verify integrity of the snippet since the generating of the script.

7. The method of claim 6, wherein the modifying of the management flag is performed for all the snippets when anyone of the snippets is determined, via the inspecting step, to have been edited.

8. A non-transitory computer readable medium storing computer readable code comprising:
   computer readable program code causing a script generation module to generate a script for a document;
   computer readable program code causing the script generation module to provide a header in each snippet of the managed script, wherein the header includes an edit verification value, wherein each of the headers includes an ID associated with the managed script;
   computer readable program code causing the computer to parse the generated document to determine whether the edit verification value for any of the snippets has been modified, wherein the parsing comprises linking the snippets to the managed script based on the ID found in the snippet headers, whereby the modification of one of the edit verification values results in all the snippets in the managed script to be removed from management; and
   computer readable program code causing the computer to modify each of the headers of the snippets of the managed script to indicate that a script manager should not manage the managed script in response to the determining indicating modification of at least one of the edit verification values.

9. The computer readable medium of claim 8, wherein the edit verification value comprises a cyclic redundancy checking value.

10. The computer readable medium of claim 8, further comprising computer readable program code devices causing the computer to load the document with the managed script, to scan the snippets, to link the snippets, and to regenerate the document with the snippet in an original order associated with the managed script during the generating of the managed script for the document.

11. The computer readable medium of claim 8, wherein the header of each snippet further comprises a script management flag identifying the snippet as belonging to a managed script object, the managed script object being identified with a managed script ID value included in the snippet.

12. A computer system comprising:
 a processor;
 data storage accessible by the processor storing an interactive, digital document;
 a script generator run by the processor to generate script comprising a plurality of snippets for the document, each snippet containing a header having an edit verification value; and
 a script manager run by the processor to provide a management flag in each of the snippets indicating active management of the snippet by the script manager and wherein each of the snippets is associated with one of a set of managed script objects, the script manager further including an ID in each of the snippets linking each of the snippets with a corresponding one of the managed script objects, the script manager also to stop management of the script in response to a detection of editing of the script outside of the script generator, whereby modification of one of the edit verification values results in all the snippets in the managed script to be removed from management.

13. The system of claim 12, wherein the script manager inserts a header into each of the snippets, the header containing a block with the management flag and a block with the ID.

14. The system of claim 12, wherein the script manager provides a CRC value in each of the snippets during the generating of the script by the script generator and wherein comparison of the CRC value with a CRC value of the scanned document is used by the script manager to determine editing without use of the script generator.

15. The system of claim 12, wherein the script generator generates a form validation user interface for receiving user input, wherein the script generator performs the script generating based on the user input, and wherein at least a portion of the snippets are associated with data entry fields in the document.

16. The system of claim 12, wherein the digital document further comprises unmanaged script and wherein the script manager parses the unmanaged script and the managed script objects to identify the snippets associated with the managed script objects based on the management flags.

17. The system of claim 16, further comprising a form creation application run by the processor for creating the digital document stored in data storage based on user input received from a user input device.

18. The system of claim 16, further comprising a user interface generator run by the processor generating a managed script user interface on a client device and wherein the managed script user interface displays the snippets of the managed script objects and does not display the unmanaged script.

\* \* \* \* \*